April 2, 1968

W. F. BEHM 3,375,845

FLUID FLOW DEVICE

Filed April 21, 1964

INVENTOR.
William F. Behm
BY
ATTORNEYS

April 2, 1968 W. F. BEHM 3,375,845
FLUID FLOW DEVICE
Filed April 21, 1964 3 Sheets-Sheet 2

INVENTOR.
William F. Behm
BY
ATTORNEYS

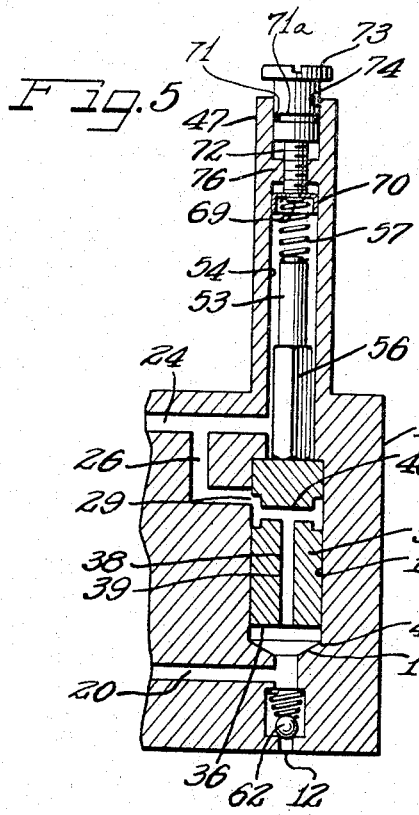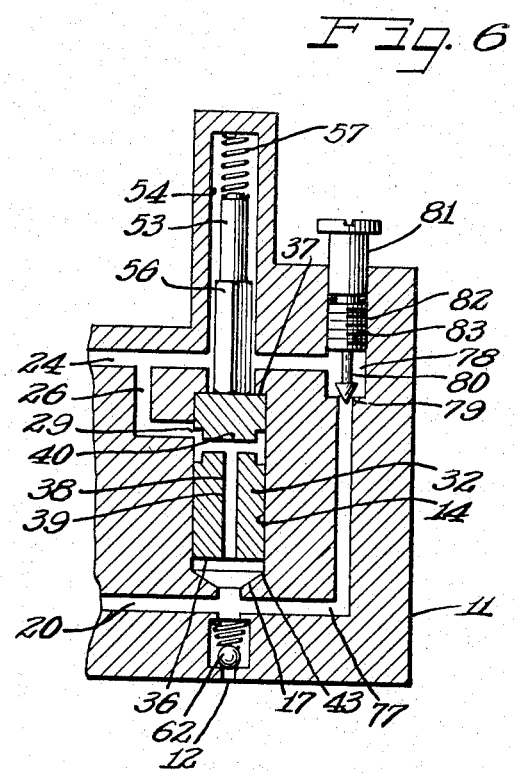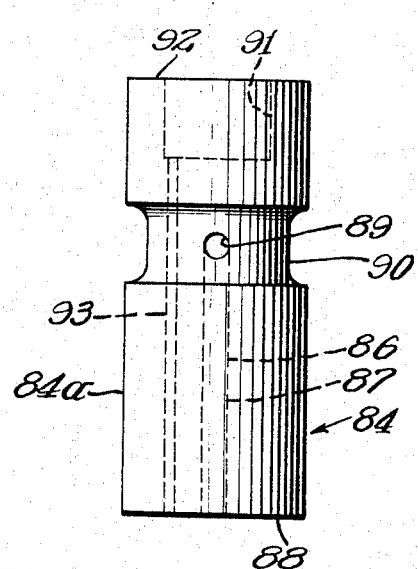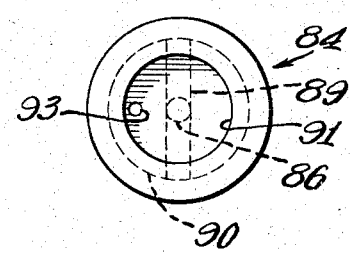

United States Patent Office

3,375,845
Patented Apr. 2, 1968

3,375,845
FLUID FLOW DEVICE
William F. Behm, Cowlesville, N.Y., assignor to Houdaille Industries, Inc., Buffalo, N.Y., a corporation of Michigan
Filed Apr. 21, 1964, Ser. No. 361,432
9 Claims. (Cl. 137—110)

ABSTRACT OF THE DISCLOSURE

A device for indicating the presence or absence of fluid flow through a conduit including a housing having a fluid inlet adapted for connection to a source of pressurized fluid, a fluid outlet and a plurality of linearly movable valve members in the housing communicating the inlet and the outlet. The valve members are spring biased to closed positions but are movable to open positions for establishing fluid flow passages between the inlet and the outlet upon an increase in fluid pressure at the inlet. The springs are arranged so that a first valve member always moves to an open position before the other valve members and an indicator is associated with the first valve member to indicate its disposition. An abutment wall in the housing restricts the movement of the first member so that in its open position it is merely "cracked." This avoids hunting of the first valve member and offers a high degree of accuracy in indicating whether the first valve member is in an open or a closed position while imposing relatively low pressure drops across a wide range of fluid flow rates.

---

This invention relates generally to hydraulic systems and more particularly relates to a flow sensing device wherein a plurality of flow valves normally movably responsive to variations in fluid pressure differential thereacross are additionally biased as a function of individual valve position, and wherein movement of the valves occurs seriatim upon increase and decrease in fluid pressure differential across the device for providing accurate indication of fluid flow through the device, or critical conditions of such flow.

In flow sensing devices such as in control and warning apparatus for monitoring equipment dependent upon lubricants, it is desirable to provide a positive indication of fluid flow over a wide range of flow rates while avoiding excessive pressure drop and erroneous indications due to pulsation of the fluid.

In prior art arrangements, certain types of flow sensing devices are provided for installation in series with the source of pressurized fluid in which the fluid passes through an orifice and an indication of fluid flow is a function of pressure drop across the orifice. Generally the utilization of such devices is not practical in a hydraulic circuit capable of a wide range of flow rates since an orifice sized for minimum flow rates may result in high pressure drop at higher flows and an orifice sized for maximum flow rates in order to preclude excessive pressure drop suffers lack of sensitivity at reduced flows.

In addition, it is not uncommon for fluid circuits to be subjected to pulsation due, for example, to the pulsating effect of a pump or other apparatus acting upon the fluid. In equipment control or warning systems incorporating sensitive flow sensing devices, such pulsation may have the deleterious effect of premature control or cycling of the equipment.

For these reasons, flow sensing devices are often engineered or tailored for specific applications and as a result are costly and cannot easily be adapted for applications other than those for which they are specifically engineered.

In accordance with the principles of the present invention means are provided for eliminating or substantially reducing the problems of excessive pressure drop and lack of sensitivity by providing a flow sensing device which is susceptible to utilization over a wide range of flow rate without excessive pressure drop, is extremely accurate in flow rate indication especially of flow rates which drop below a permissible minimum, while not being subject to minor flow variations due to pulsation and is particularly suited for use in a variety of applications while requiring only minor modification.

Accordingly, it is an object of the present invention to provide improved methods and apparatus for sensing flow in a hydraulic system.

Another object of the present invention is to provide a method and apparatus for sensing flow wherein a plurality of flow valves normally movably responsive to variations in fluid pressure differential thereacross are additionally biased as a function of individual valve positions.

A further object of the present invention is to provide a flow sensing device using a plurality of flow valves, the movement of which occurs seriatim upon increase and decrease in fluid pressure differential across the device for providing an accurate indication of fluid flow therethrough.

Another object of the present invention is to provide a flow sensing device utilizing a restricted flow passage for providing sensitivity at reduced flow rates while being substantially nonresponsive to pulsation and utilizing a larger flow passage for accommodating increased flow rates without excessive pressure drop.

Another object of the present invention is to provide a flow sensing device adapted for ready modification to suit a variety of applications.

Many other features, advantages and additional objects of the present invention will become manifest to those versed in the art upon making reference to the detailed description which follows and the accompanying sheets of drawings in which a preferred structural embodiment of a flow sensing device incorporating the principles of the present invention is shown by way of illustrative example.

*On the drawings*

FIGURE 5 is a fragmentary cross-sectional view of a flow sensing device of the present invention incorporating apparatus for adjusting the device;

FIGURE 6 is a fragmentary cross-sectional view of a flow sensing device showing a modified form of the adjusting apparatus;

FIGURE 7 is an elevational view of another embodiment of a piston or valve assembly constructed in accordance with the principles of the invention; and FIGURE 8 is a top plan view of the piston of FIGURE 7.

*As shown on the drawings*

Figure 1:
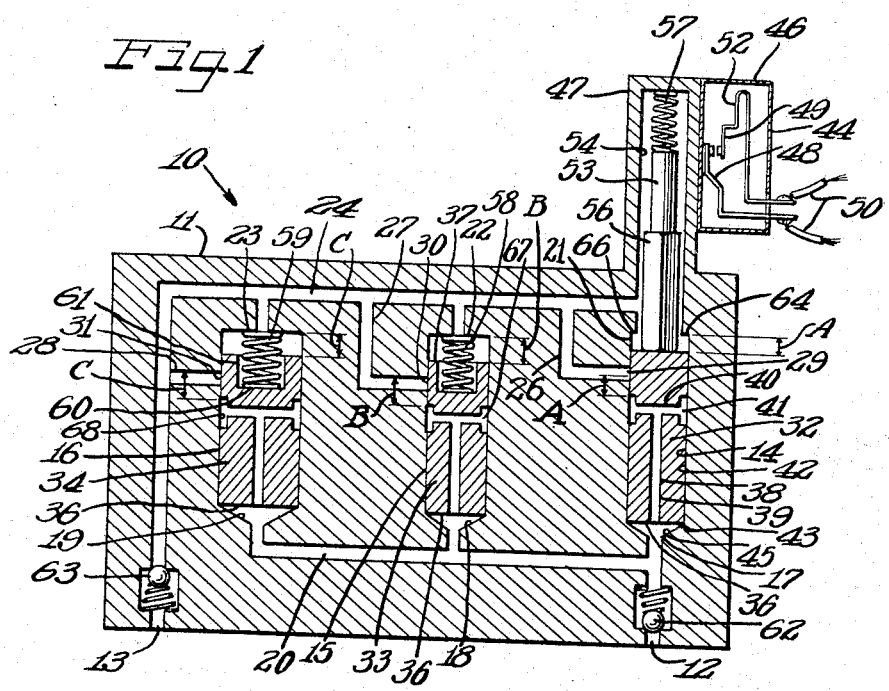
FIGURE 1 is a cross-sectional view of a flow sensing device embodying the principles of the present invention with parts shown in elevation.
Figure 2:
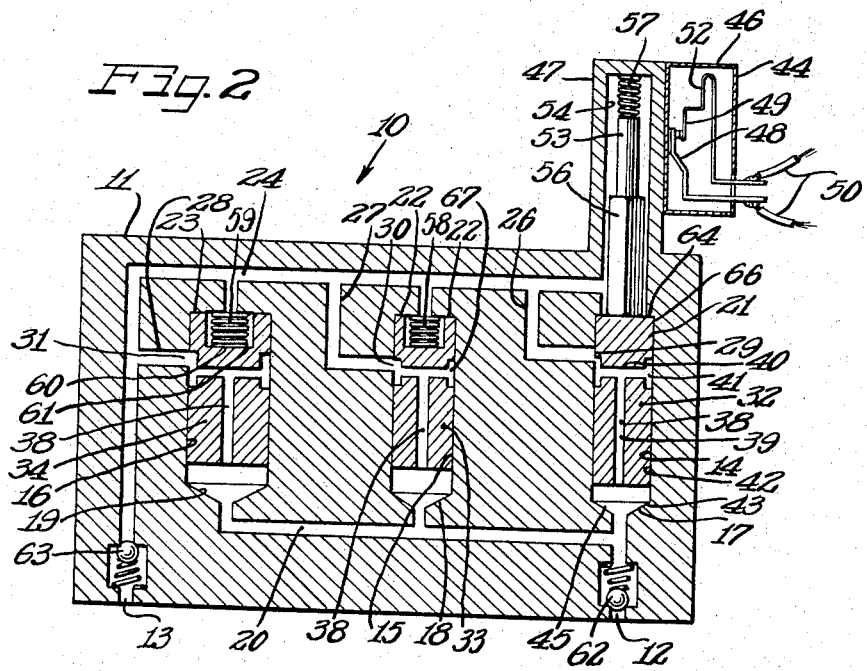
FIGURE 2 is similar to FIGURE 1 and ilustrates the flow sensing device in an adjusted position.

A flow sensing device constructed in accordance with the principles of the present invention is indicated generally at 10 in FIGURES 1 and 2 and includes a housing 11 having an inlet 12 for connecting to a source of pressurized fluid and an outlet 13 for connecting to a point of utilization.

The housing 11 is particularly characterized as having formed therein a plurality of valve chambers or piston cylinders indicated at 14, 15 and 16 connected at one end portion thereof as at 17, 18 and 19 to a fluid inlet passage 20 in open fluid communication with the inlet 12 and connected at an opposite end portion thereof as at 21, 22 and 23 to a fluid outlet passage 24 in open fluid communication with the outlet 13. Each of the respective cylinders or valve chambers 14, 15 and 16 is also connected to the outlet passage 24 by means of branch passageways as at 26, 27 and 28 which open into the valve chambers intermediate the end portions thereof through ports 29, 30 and 31.

Slidably carried for linearly reciprocable movement within each of the valve chambers is a valve mechanism which may conveniently take the form of an elongated complementarily shaped piston as indicated respectively at 32, 33 and 34.

Each of the pistons 32–34 comprises an end face or motive surface 36 in communication with the inlet passage 20 and an opposite motive surface 37 constituting a transverse area equal to the cross-sectional area of the respective cylinders and in communication with the outlet passage 24.

Formed within each of the pistons 14–16 is a flow passage as at 38 comprising an axial channel 39 extending from the motive surface 36 and in communication with the inlet passage 20 and a transverse cross-channel 40 communicating with an annularly shaped circumferentially continuous ring groove 41 which opens to cylinder wall 42 of the respective cylinders 14–16.

In order to restrict downward movement of the pistons 32–34 in the cylinders 14–16, the end portions 17–19 of each of the respective cylinders comprises a sharply tapered axially inwardly extending wall portion 45 which forms a shoulder as at 43 for abuttingly engaging the lower end face or motive surface 36 of the respective pistons.

In accordance with the principles of the invention, one of the pistons, for example, piston 32, acts as a primary piston, the movement of which actuates suitable flow indicating mechanism for indicating fluid flow through the device 10. In the illustrated embodiment the indicating mechanism comprises an electric switch means 44 mounted in a housing 46 connected in fixed assembly to an extension 47 of the housing 11 and includes a pair of contacts 48 and 49 connected by suitable electric circuit means as at 50 which are adapted, in turn, to connect to a source of electric power which may be connected in series to a control or warning device such as an electric light or bell (not shown). It will be appreciated however, that the switch means 44 may be advantageously utilized to connect to a variety of apparatus such as machinery controllers and the like, the energization and deenergization of which is desirably a function of fluid flow through the device 10.

As illustrated, contact 49 comprises a flexible arm member 52 situated in normally spaced relation to the contact 48. In order to actuate contact 49 in response to movement of the primary piston 32, this contact may constitute suitable magnetic material and a magnet 53 may be housed in an extension bore 54 formed in the extension 47 in axial alignment with cylinder 14 and maintained in spaced relation to piston 32 by means of a spacer member or bar 56. Travel of the magnet 53 to a position substantially opposite the arm member 52 will act to attract and bias contact 49 into abutting engagement with contact 48. Travel of the magnet 53 away from the arm member 52 will serve to separate the contacts and deenergize the electric circuit means connected thereto.

For reasons apparent hereinafter, all of the pistons or valves 32–34 are normally biased toward the lower end portions 17–19 of their respective cylinders as illustrated in FIGURE 1. For this purpose means are provided for applying a downward bias to the pistons, the respective applied forces of which are a function of the linear displacement of the pistons.

Thus, a coil spring 57 is housed in the extension bore 54 and acts upon the magnet 53 and the spacer bar 56 for urging the piston 32 into abutting engagement with the shoulder 43 of the cylinder 14. Similarly, coil springs 58 and 59 are housed respectively in cylinders 15 and 16 and are received at one end thereof as at 60 in recesses 61 formed in the motive surfaces 37 of the pistons 33 and 34 for urging the pistons downwardly toward the lower end portions of their respective cylinders. Thus, where an inoperative or "no-flow" condition has existed for a sufficient length of time, the pistons or valves 32–34 are situated as illustrated in FIGURE 1.

In accordance with the invention, the biasing forces of the springs 57–59 are correlated to the effective areas of the motive surfaces 36 of the respective pistons such that a continuous increase in fluid pressure in the inlet passage 20 (caused by the beginning or increase of flow) will result first in an upward movement of the primary piston 32, then in an upward movement of one of the other pistons and finally upward movement of the third piston. For example, in the embodiment illustrated, a gradual increase in fluid pressure in the inlet passage 20 will act equally on the motive surfaces of all of the pistons. However, the quotient of the biasing forces of the respective coil springs 57–59 and the effective areas of the motive surfaces 36 of the respective pistons is such that such pressure increase will result in an upward movement of piston 32 while pistons 33 and 34 still remain in their lower limiting end positions.

As soon as flow through inlet passage 20 starts, the primary piston begins to rise, which is accompanied by sufficient pressure rise to overcome the biasing spring force, which is proportional to the linear displacement of the piston. Assuming the system was filled with liquid, liquid will be discharged from the top portion 21 of cylinder 14 as soon as the piston moves, even before an opening of port 29 takes place.

Eventually, sufficient pressure increase in the inlet passage 20 will cause the piston 32 to move upwardly to an extent such that the ring groove 41 thereof "cracks" the port 29 of the branch passage 26, and true fluid flow is thereupon established from the inlet passage 20, through the flow passage 38 and the branch passage 26 of piston 32 to the outlet passage 24. It will be noted that check valves 62 and 63 are situated at the inlet 12 and outlet 13 for preventing back flow therethrough.

The magnet 53 is situated with respect to the contact 49 such that as the ring groove 41 of the piston 32 cracks port 29, contact 49 engages contact 48 for energizing the switch 44.

In order to avoid "hunting" action of the piston 32 due to pulsation of fluid pressure acting thereon, means are provided for limiting further upward movement of the piston 32 after the port 29 has cracked. Accordingly, the housing 11 defines a shoulder portion 64 at an upper end portion 66 of the cylinder 14 for abuttingly engaging the motive surface 37 of the piston 32. For example, in FIGURE 1 reference character A indicates maximum displacement of the piston 32 from a lower to an upper limiting end position. It will be noted, however, that this distance A also represents the necessary piston displacement to merely "crack" the port 29 with the ring groove 41. As a result, the effective open area of the port 29 in an upper limiting end position of the piston 32 comprises a restricted orifice capable of sustaining only a small flow rate with a tolerable pressure drop thereacross. As a consequence, hunting action of the piston 32 is substantially eliminated, since the piston will remain in its upper limiting end position regardless of substantial pulsation of flow.

With flow established through the flow passage 38 of piston 32 the motive surfaces 36 and 37 thereof are subjected to a fluid pressure differential substantially equal to the pressure drop across the orifice defined by the port 29 and the ring groove 41.

Assuming a further increase in fluid pressure volume of flow through the device, the pressure differential across piston 32 increases and the force applied to motive surface 36 of the piston 33 will be ultimately sufficient to overcome the oppositely directed biasing force of the coil spring 58 and piston 33 will begin to move upwardly from its lower limiting end position as viewed in FIGURE 1. A continued rise in inlet pressure caused by the rising orifice pressure losses will eventually move the piston 33 to its upper limiting end position, a total distance indicated by the reference character B, which distance is also equal to the travel necessary for ring groove 67 of the piston 33 to completely open port 30 of the branch passage 27, thereby providing a relatively unrestricted or enlarged by-pass around the restricted flow passage 38 of piston 32 for accommodating higher flow rates without substantially greater pressure losses.

During upward travel of the piston 33 to its upper limiting end position, the piston 34 remains at rest since the effective biasing force of its coil spring 59 is correlated to be sufficient to overcome fluid pressure increases acting on the motive surface 36 of the piston until piston 33 has moved to its upper limiting end position and has compressed its coil spring 58 accordingly. Thereafter, continued inlet pressure increase will begin to move piston 34 upwardly from its lower limiting end position and possibly to its upper limiting end position, a distance indicated by the reference character C, which is also the piston travel necessary for ring groove 68 to completely open the port 31, thereby providing an additional relatively enlarged by-pass around the restricted flow passage 38 of the piston 32.

It will be noted that the device is unaffected by static pressures existing in the hydraulic system of which it is a part, and that all pressure increases and decreases described here are the consequences of changes of rate of flow through the device and are superposed to otherwise existing system pressures.

FIGURE 2 of the drawing illustrates the positioning of the pistons or valves 32–34 after a sufficient rise in flow volume has acted to move all of the pistons to their upper limiting end position. In addition, the contacts 48 and 49 are shown in a closed position, having been thusly acted upon by the magnet 53 as the primary piston 32 "cracked" the port 29. Although the illustrated embodiment shows one primary piston and two secondary pistons, it will be understood that the optimum number of secondary pistons which may be effectively utilized depends upon such factors as the maximum anticipated flow rate through the device 10, maximum allowable pressure drop thereacross, and the like conditions and parameters.

With the pistons 32–34 in position as illustrated in FIGURE 2, substantial pulsation in the inlet passage 20 will not effect downward movement of the primary piston 32 to deenergize the switch 44, although such pulsation may have the effect of oscillating piston 34 or even piston 33. However, piston 32 will remain substantially immobile until the flow volume and thereby the pressure differential between the inlet passage 20 and the outlet passage 24 decreases sufficiently to cause piston 34 and then piston 33 to return to their limiting end positions. Subsequently, a further reduction in inlet pressure will eventually cause primary piston 32 to move toward its lower limiting end position, the initial downward movement of which acts to close port 29.

Accordingly, after all or part of the pistons are situated at or near their upper limiting end positions, a subsequent decrease in flow will tend to return all of the pistons in series to their lower limiting end positions. For example, as soon as the port 31 has been closed by the movement of piston 34, continued downward movement of this piston will tend to force the fluid housed within the lower end portion 19 of the cylinder 16 back through inlet passage 20 to be passed through the flow passages of the pistons 33 and 32 and to be returned to the top portion 23 of cylinder 34. A continued reduction in pressure differential will serve to move piston 33 toward its lower limiting end position and to force the fluid in the lower end portion 18 of the cylinder 15 back through inlet passage 20 through the flow passage 38 of the piston 32 and return to the top portion 22 of cylinder 15.

Upon continued decrease of pressure differential, the primary piston 32 will move downwardly to close port 29. As soon as port 29 is closed, continued downward movement of the piston 32 is opposed by the fluid in the lower end portion 17 of the cylinder 14. Since the check valve 62 prevents back flow through the inlet 12, the piston 32 will not move additionally downwardly until sufficient fluid leakage past pistons 32–34 has occurred in the cylinders 14–16 to enable this additional downward movement of the piston 32 resulting in a deenergization of switch 44 to indicate a "no-flow" condition.

Consequently, there exists a "time lag" between the time the port 29 is closed and the time switch 44 indicates a "no-flow" condition. It will be apparent that this time lag is dependent upon such factors as the fit of the pistons in the cylinders, the viscosity of the fluid, the volume displaced in cylinder 15 and its relation to the maximum port opening in cylinder 14, and the like considerations.

In addition, a time lag may result upon abrupt cessation of flow from the source of pressurized fluid, or pronounced pulsations of the fluid. For example, if the fluid flow from the source through inlet 12 is suddenly discontinued, the primary piston 32 will remain at its upper limiting end position and continue to energize switch 44 to indicate a "flow" condition until pistons 34 and 33 have returned to their lower limiting end positions, regardless of such sudden discontinuance of fluid flow. This time lag is, of course, desirable to preclude premature control and other undesirable effects of brief intermittent discontinuance of flow or pronounced pulsations, but should preferably be kept within reasonable limits.

Referring to FIGURE 5, wherein like reference numerals are used to indicate like elements a modified embodiment of the instant invention is illustrated wherein means are provided for adjustably varying the "time lag" or "reaction period" of the primary piston 32.

As indicated, a top end portion 69 of the coil spring 57 is received in a dish-shaped spring retainer member 70 slidably carried within the extension bore 54 and engages a lower threaded stud portion 72 of an adjustment screw member 73 extending outwardly of an opening 74 formed in the uppermost end of the housing extension 47. Adjustment of the screw member 73 in a reduced diameter complementarily threaded portion 76 of the bore 54 will correspondingly affect the biasing force of the coil spring 57 whereby the inlet pressure required to "crack" piston 32 can be varied, as well as the "time lag" for travel of the piston to its lower limiting end position when flow through the inlet 12 has discontinued. It will be appreciated, however, that in order to maintain sequential or series operation of the primary piston and the second pistons, the quotient of the biasing force exerted by the coil spring 57 on the primary piston 32 when the piston has attained its upper limiting end position divided by the force applied to the piston at the motive surface 36 is always less than the quotient of similar forces acting on the associated secondary pistons.

It will be observed that an O ring 71 is received in a circumferentially continuous groove 71a formed in the screw member 73 for preventing leakage of fluid past the screw.

FIGURE 6 is illustrative of another ararngement of the present invention whereby means are provided for controlling the "time lag" or "reaction period" of the primary piston. As indicated, a return flow passage or by-pass channel 77 is formed in the housing 11 for interconnecting the oppositely facing motive surfaces 36 and 37 at opposite ends of the primary piston 32. An enlarged chamber 78 is situated in the passage 77 and forms a shoulder portion 79 for providing a valve seat for a needle valve 80 adjustably controllable to restrict fluid flow through the passage 77 by means of a threaded screw member 81 fixedly connected thereto and threadedly engageable as at 82 in a complementarily threaded bore 83 formed in the housing 11. Suitable adjustment of the needle valve 80 away from the valve seat 79 will result in reduced "time lag" for return of the piston 32, whereas further restriction in the passage 77 will correspondingly increase this "time lag" period.

Referring to FIGURES 7 and 8, a modified form of a valve or piston member constructed in accordance with the principles of the present invention is indicated generally at 84 and has formed therein a flow passage 86 comprising an axially disposed channel 87 extending from a lower motive surface 88 to a transversely extending cross-channel 89 in open communication therewith and opening into a circumferentially continuous ring groove portion 90 formed in a peripheral outer wall 84a. An axial recessed portion 91 is formed inwardly from an opposite motive surface 92 for receiving a biasing means such as a spacer bar or a coil spring (not shown) and also formed within the piston 84 is an axially extending relatively reduced diameter aperture or return flow passage 93 in open communication with the motive surface 88 and the recess 91 for providing restricted flow communication between the opposite ends of the piston 84.

The modified piston 84 may be advantageously utilized as a substitute for the pistons previously described in order to reduce the "time lag" for return of the pistons from an upper limiting end position to a lower limiting end position, particularly when highly viscous fluids are utilized. If desired, the primary piston may be of the type illustrated in FIGURES 7 and 8, whereas the secondary pistons may be of the type illustrated in FIGURES 1 and 2, or, in the alternative, all of the pistons or plunger valves may be of the type illustrated in FIGURES 7 and 8. Although enlargement of the aperture 93 will result in an additionally reduced "time lag," the restriction offered thereby should not be so low as to adversely affect the function of the piston under normal operating conditions.

Figure 3:
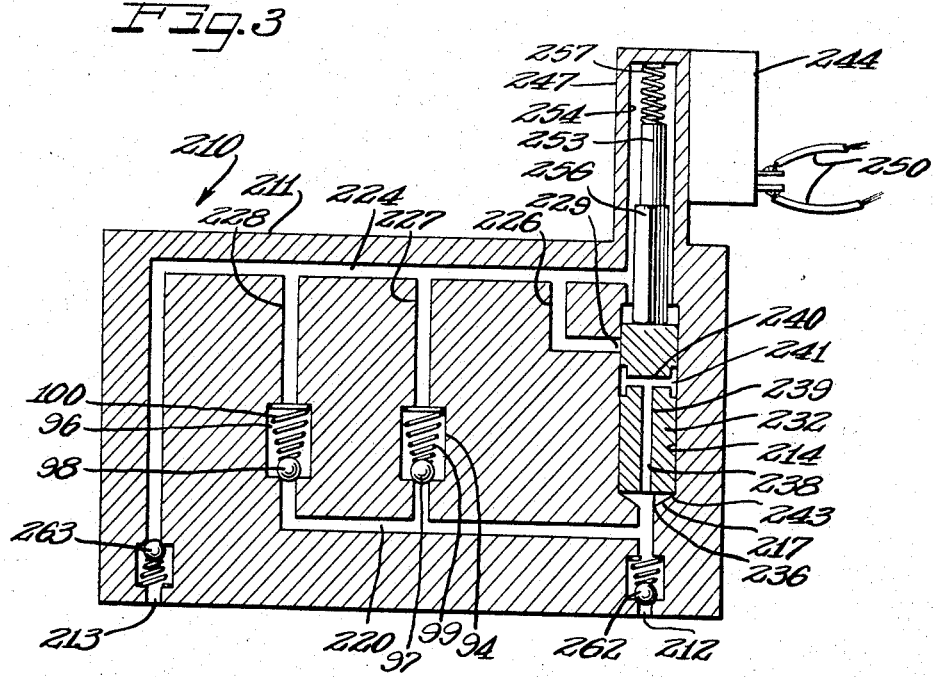
FIGURE 3 is a cross-sectional view of another embodiment of the present invention.

Referring to FIGURE 3, wherein ports similar to those of FIGURES 1 and 2 are given the same reference numerals but in the "200" series, another embodiment of the instant invention is illustrated wherein the by-pass valve action of the secondary pistons 33 and 34 of FIGURES 1 and 2 is performed by a pair of check valves as at 94 and 96 comprising ball checks 97 and 98 normally biased to a closed position by coil springs 99 and 100, the biasing force of which is a function of the displacement of the ball checks 97 and 98. Opening of the check valves 94 and 96 is a function of the differential in fluid pressure on either side of the ball checks and the springs 99 and 100 are correlated such that one of the check valves will be urged to an open position before the other. Of course, the fluid displaced by movement of the ball checks is practically nil, and therefore there is little internal circulation of fluid from the check valves back to the primary piston upon a decrease or discontinuance of fluid flow at the inlet 12. It will be appreciated, therefore, that the embodiment of FIGURE 7 does not lend itself to increased "time lag" periods for return of the primary piston from its upper to its lower limiting end position due to fluid pumping action of the secondary pistons.

As mentioned heretofore, the viscosity of the fluid being circulated through the device 10 is one factor determinative of leakage flow past the pistons and, additionally, the "time lag" period for the return thereof.

Figure 4:
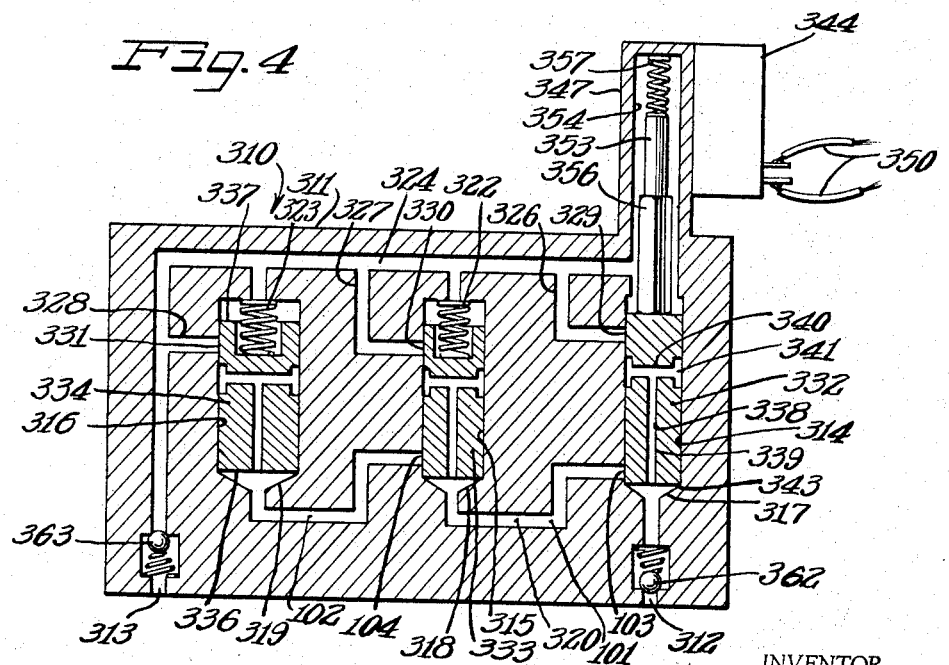
FIGURE 4 is a cross-sectional view of another embodiment of the present invention.

FIGURE 4 illustrates another embodiment of the invention which may advantageously be utilized in connection with fluids having a very low viscosity to reduce the rate of leakage and thereby shorten the "opening" time of the pistons and lengthen the "closing" time thereof. Ports similar to those of FIGURES 1 and 2 are given the same reference numerals, but in the "300" series.

As illustrated, inlet passage 320 comprises first and second offset passages 101 and 102 which connect respectively the lower end portions 318 and 319 of the cylinders 315 and 316 with ports 103 and 104 formed respectively in the cylinder walls of cylinders 314 and 315.

Thus, cylinders 315 and 316 are not subjected directly to inlet pressure until the primary piston 332 has moved substantially to its upper limiting end position. Thereafter, cylinder 316 is not in direct fluid communication with the inlet passage 320 until the piston 333 has moved substantially to its upper limiting end position. Such arrangement, by reducing leakage past the pistons or plunger velves, provides for greater flow sensitivity and also more closely controls the movement of the secondary pistons.

It will be appreciated that the diameters or cross-sectional areas of the various plungers or pistons can be varied and, for that matter, can all be equal. It is desirable, of course, that the correlation of the respective piston biasing forces and areas of motive surfaces be such that the sequence or series operation be maintained. It will further be noted that the diameters and displacements of the various secondary pistons are a factor in determining the "time lag" period of the primary piston after flow through the inlet 12 of the device 10 has been discontinued, and this is particularly true with respect to piston 33, that is, that secondary piston the return movement of which next precedes the return movement of the primary piston to its lower limiting end position. Consequently, the "time lag" period of the primary piston can be substantially varied in accordance with variations in the displacement of the next preceding secondary piston.

Although minor modifications might be suggested by those versed in the art, it should be understood that I wish to embody within the scope of the patent warranted hereon all such modifications as reasonably come within the scope of my contribution to the arts.

I claim as my invention:

1. In a fluid flow device,
   first linearly movable valve means having an inlet for connection to a source of pressurized fluid, an outlet and a first flow passage communicating said inlet and said outlet,
   said first valve means having a motive surface at one end thereof in communication with said inlet for urging said first valve means toward one direction for establishing flow through said first flow passage and having biasing means at the other end thereof for urging said first valve means toward an opposite direction for preventing flow through said first flow passage,
   second linearly movable valve means having an inlet and an outlet connected to said inlet and said outlet of said first valve means and a second flow passage communicating said inlet and said outlet thereof,
   said second valve means having a motive surface at one end thereof in communication with said inlet thereof for urging said second valve means toward one direction for establishing flow through said second flow passage and having biasing means at the other end thereof for urging said second valve means toward an opposite direction for preventing flow through said second flow passage,
   means restricting movement of said first valve means in in said one direction to a craked position relative to said second valve means whereby hunting of said first valve means is avoided and whereby said second flow passage is substantially larger than said first flow passage to accommodate increased flow rates through said device while minimizing pressure drop, and means indicating the establishment of fluid flow through said first flow passage, the respective ratios of the forces applied by the biasing means and the motive surfaces of said first and second valve means being such that flow in said first flow passage will be established before flow in said second flow passage.

2. The fluid flow device as defined in claim 1 wherein said first valve means comprises a linearly movable piston.

3. The fluid flow device as defined in claim 2 wherein said second valve means comprises a linearly movable piston.

4. The fluid flow device as defined in claim 2 wherein said second valve means comprises a check valve member.

5. The fluid flow device as defined in claim 1 wherein said inlets of said first and second valve means are connected to each other in parallel relation.

6. The fluid flow device as defined in claim 1 wherein said inlets of said first and second valve means are connected to each other in series relation.

7. The fluid flow device as defined in claim 1 and including, means forming a restricted return flow passage between the ends of said first valve means to provide for relatively faster movement of said first valve means in said opposite direction thereof upon a decrease in fluid pressure at said inlet thereof.

8. The fluid flow device as defined in claim 7 wherein said restricted return flow passage is formed in said first valve means.

9. The fluid flow device as defined in claim 7 and including adjustable control means for selectively controlling the restriction of said return flow passage.

References Cited

UNITED STATES PATENTS

| | | | |
|---|---|---|---|
| 2,665,704 | 1/1954 | Kanuch | 137—110 |
| 2,980,173 | 4/1961 | Perkey | 137—599 X |
| 3,067,761 | 12/1962 | Absalom | 137—512.1 X |
| 3,097,665 | 7/1963 | Gauldie | 137—494 X |
| 3,151,624 | 10/1964 | Koutnik | 137—554 X |
| 3,200,214 | 8/1965 | Aubert | 251—65 |

WILLIAM F. O'DEA, *Primary Examiner.*

D. J. ZOBKIW, *Assistant Examiner.*